(12) United States Patent
Pallemulle et al.

(10) Patent No.: US 9,609,042 B1
(45) Date of Patent: Mar. 28, 2017

(54) GENERATION OF BACKGROUND CONTENT REQUESTS FOR PERFORMANCE ANALYSIS

(71) Applicant: Amazon Technologies, Inc., Reno, NV (US)

(72) Inventors: Sajeeva Lakmal Bandara Pallemulle, Woodinville, WA (US); Saral Jain, Seattle, WA (US); Ameet Nirmal Vaswani, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 340 days.

(21) Appl. No.: 13/967,284

(22) Filed: Aug. 14, 2013

(51) Int. Cl.
G06F 15/16 (2006.01)
H04L 29/08 (2006.01)

(52) U.S. Cl.
CPC ................... H04L 67/02 (2013.01)

(58) Field of Classification Search
CPC .................................. H04L 63/1408
USPC ................................. 709/217, 219
See application file for complete search history.

(56) References Cited

U.S. PATENT DOCUMENTS

| | | | |
|---|---|---|---|
| 6,738,813 B1* | 5/2004 | Reichman | 709/224 |
| 7,197,559 B2* | 3/2007 | Goldstein | G06F 11/323 709/224 |
| 9,098,333 B1* | 8/2015 | Obrecht | G06F 9/50 |

* cited by examiner

Primary Examiner — Wing F. Chan
Assistant Examiner — Andrew Woo
(74) Attorney, Agent, or Firm — Knobbe Martens Olson & Bear LLP

(57) ABSTRACT

Features are disclosed for automatically generating content requests and recording metrics and other information about execution of the requests. The requests can be background requests, executed by user computing devices during idle periods and without any user initiation. The background requests may be browser requests for content pages. Metrics and other information about execution of the requests may be recorded during execution of the background requests and reported to a performance analysis system. Instructions to execute background requests can be generated so as to develop a data set, such as a data set for analyzing request execution performance.

23 Claims, 5 Drawing Sheets

GENERATION OF BACKGROUND CONTENT REQUESTS FOR PERFORMANCE ANALYSIS

BACKGROUND

Computing devices can be used to request content from other computing devices over a communication network. In a common application, a client computing device can request a web page from a server computing device via the internet. Browser application software on the client computing device typically retrieves a requested web page, processes resource identifiers embedded in the web page to generate requests for additional resources (e.g., images, script files, etc.), and renders the content for presentation. From the perspective of a user of a client computing device, a user experience can be defined in terms of the performance and latencies associated with obtaining and rendering the requested network content on the client computing device. Latencies and performance limitations of any of the above processes may diminish the user experience.

Optimizations and other improvements may be implemented to reduce latency and otherwise improve the user experience. Conventionally, content providers or third parties may generate test requests (e.g., from a fleet of test devices or servers under the control of the content provider or a third party) in order to obtain performance data about the retrieval process for various content. This data may be analyzed to help identify the causes of latencies and performance limitations, and to implement optimizations and other improvements to the user experience.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
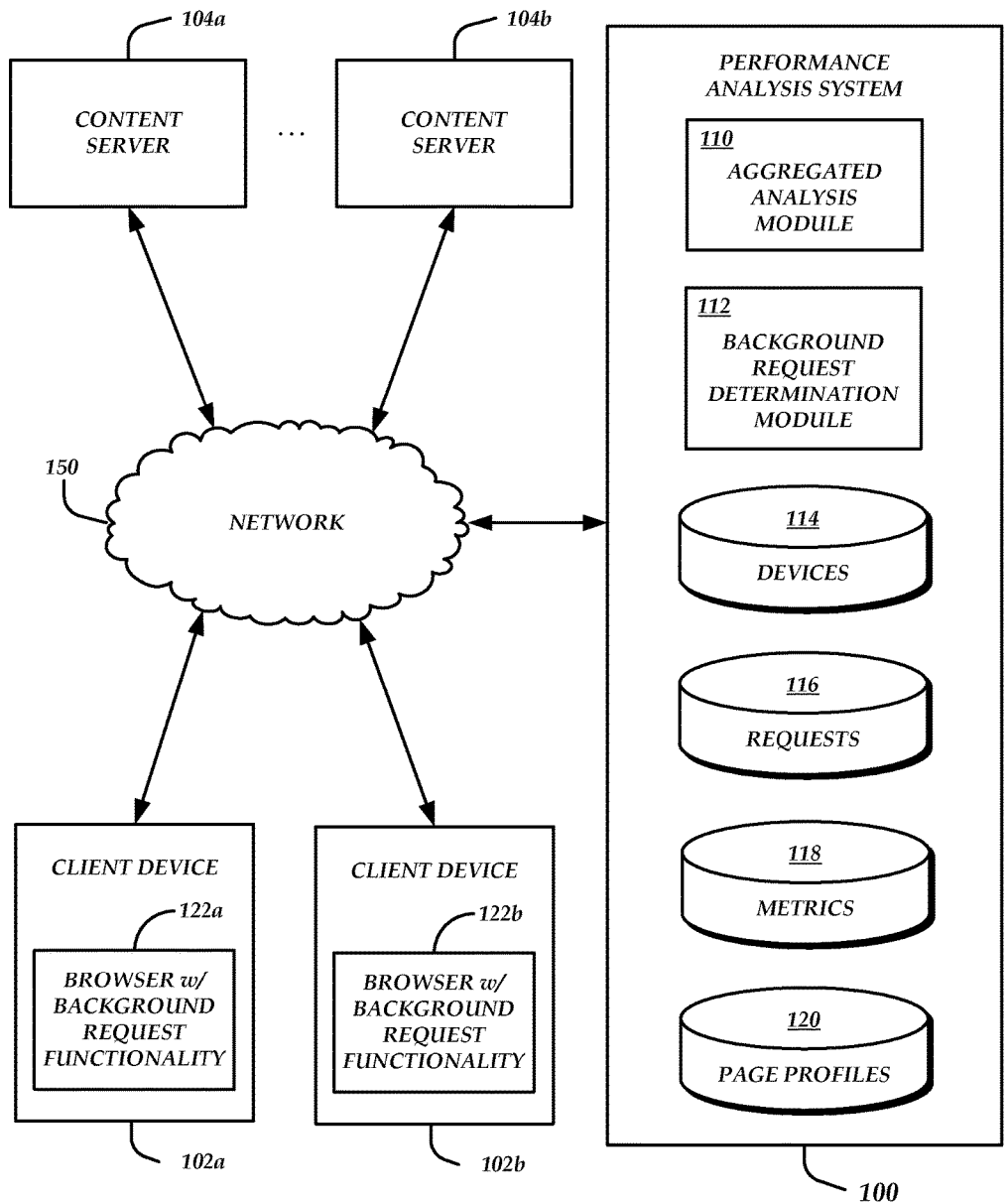
FIG. 1 is a block diagram of an illustrative content delivery environment including a multiple client devices, multiple content serves, and a performance analysis system.

The present disclosure is directed to generating background content requests while a browser or device is idle in order to obtain desired information about execution of the requests. The desired information, also referred to herein as request analysis information, may include performance metrics regarding execution of the background requests, contextual or environmental data regarding various contexts and environmental conditions in which the background requests are made, and other information associated with execution of the requests. In some embodiments, the background requests are tailored to obtain request analysis information about requests executed in contexts and environment conditions that may be difficult to replicate in a conventional testing or data-gathering implementation.

Some conventional performance analysis systems can obtain metrics and other information regarding content retrieval performance (e.g., loading time, rendering time, network latency, etc.) when a device retrieves content in response to a user request. Performance analysis systems may obtain metrics regarding these retrieval operations in order to determine, e.g., which optimizations may be implemented to improve future retrieval performance. However, relying on these user-initiated requests can create holes in a desired set of request analysis information due to the lack of control by the performance analysis system over what content is requested, and under what conditions it is requested. In order to fill these holes in the desired request analysis information, a performance analysis system may generate test requests from client devices under exclusive or otherwise direct control of the system (e.g., a fleet of test devices), from server devices, or the like. However, these test requests may not provide satisfactory request analysis information because they are not made under the real-world conditions experienced by users and client devices. For example, the varied network conditions experienced by users around the world, or even across large geographic regions, can be difficult or impossible to replicate when generating requests from a fleet of test devices or servers under direct control of the analysis system. As a result, there may not be enough data regarding real-world requests (e.g., actual user-initiated requests and other non-testing requests) to support a meaningful analysis.

Some aspects of the present disclosure relate to instructing client devices to request particular content during idle periods in order to obtain desired request analysis information without interfering with the user's experience. A performance analysis system may determine one or more content requests that a particular client device (or group of devices) is to execute. The client device, also known as a user device, can execute the requests during idle periods. For example, if a user of the client device has not interacted with a browser application for a threshold period of time, then one or more of the requests determined by the performance analysis system can be executed by the browser application. The browser or some other component of the client device can record metrics regarding performance of the request, and provide the metrics to the performance analysis system. For example, a browser may request a particular content item and record information about the content retrieval speed, latency, error rate, efficiency, etc. associated with performance of the request. The request may be executed as a background request such that the content is not displayed to the user. In some embodiments, the content may also be rendered into a hidden frame or buffer in order to record metrics regarding rendering of the content.

Additional aspects of the present disclosure relate to identifying content request metrics and/or browsing session context data that will aid in a particular performance analysis procedure. A performance analysis system can generate background request instructions designed to obtain a statistically significant amount of the desired request analysis information, and provide the background request instructions to candidate client devices. For example, a performance analysis system may wish to determine the circumstances under which particular content items should be requested via a proxy server and the circumstances under which the same content items should be requested directly from the origin server. The performance analysis system may have access to performance metrics regarding many requests for the content items from client devices in a first geographic region. However, the system may not have a critical mass of data regarding requests from client devices in a second geographic region. The system can generate background request instructions for client devices in the second region to request the specific content items and provide performance metrics to the performance analysis system. These background request instructions may not be provided to client devices in other geographic regions. As another example, the performance analysis system may wish to determine the performance of requests for certain content (or content in general) on computing devices with various characteristics (e.g., operating system, browser version, device model, form factor, display size, input devices, processor type, etc.). The performance analysis system can generate background request instructions for client devices with certain target characteristics to request the content and report metrics regarding request and/or rendering performance.

Although aspects of the embodiments described in the disclosure will focus, for the purpose of illustration, on browser applications executing background requests for electronic content pages, one skilled in the art will appreciate that the techniques disclosed herein may be applied to any number of services, process, or applications. For example, applications which retrieve or stream audio and/or video content may also be instructed to make background requests, record performance metrics, and provide those metrics to a performance analysis system. Various aspects of the disclosure will now be described with regard to certain examples and embodiments, which are intended to illustrate but not limit the disclosure.

With reference to an illustrative embodiment, a performance analysis system may require or desire data regarding network content retrieval performance. In some embodiments, the desired request analysis information may include metrics regarding bandwidth utilization, latency, request volume, number of network hops between client and server, rendering performance, and other metrics associated with network and/or device performance during content retrieval and rendering events. The performance analysis system may use such data to, e.g., identify optimizations or other improvements that may be implemented in order to improve content retrieval performance. In some embodiments, those optimizations may include dynamic determination of when to use a proxy server, development of content page profiles, development of user and/or client device profiles, dynamic determination of when to pre-cache network resources, etc.

Although the performance analysis system may obtain, from client devices, request analysis information associated with actual user requests, the amount of data associated with such requests may be insufficient in certain respects to support a meaningful analysis. Performance analysis systems may utilize fleets of test devices, servers, and other means for controlling the generation of requests and development of request analysis information. However, such testing methods may also result in request analysis information that is insufficient to support meaningful analysis or that is otherwise unsatisfactory. For example, fleets of test devices under the direct control of the performance analysis system may fail to adequately emulate the various real-world circumstances encountered by client devices operated by users in different geographic regions, heterogeneous network topologies, varied request loads, different software execution and computing resource environments, and the like.

In order to obtain request analysis information that covers the desired range of contextual and environmental circumstances, the performance analysis system may determine which areas of the desired data set lack a statistically significant or otherwise satisfactory amount and/or character of data. For example, the performance analysis system may be collecting data regarding the use of proxy servers for a particular set of web pages in order to determine whether, and under what circumstances, it is beneficial to use a proxy and when it is not. In particular, the performance analysis system (or a user or operator thereof) may be attempting to determine which network connection characteristics are associated with a performance gain when using a proxy, and which network connection characteristics are associated with neutral performance, or performance degradation, when using a proxy. If a large number of network connection characteristics are to be analyzed, it can be difficult to obtain a statistically significant amount of data from actual user-initiated requests. In these cases, the performance analysis system can identify particular network characteristics for which the system does not have enough performance metric data. The system can generate background request instructions for devices associated with those network characteristics to request particular web pages both directly, and via a proxy, and to report performance metrics regarding each of these requests to the performance analysis system.

As used herein, the term "background request" refers to any request that is automatically initiated by a browser or some other component of a client computing device (i.e., not initiated by a user). The content received in response to a background request is typically not immediately displayed to a user. In some embodiments, background requests can be executed during idle periods. The idle period may be a period of little or no user interaction with the browser application, a period of little or no user interaction with the device, a period of little or no network activity, some combination thereof, or some other period during which execution of the request will not negatively impact user-initiated or other important computing tasks. In some embodiments, the content received in response to a background request may eventually be presented for display. For example, the content received in response to background requests can be cached on the client device so that it is available to quickly display if a user subsequently requests the content.

The performance analysis system may provide background request instructions to client devices in several different ways. In some embodiments, the performance analysis system may be notified by a client device upon initiation of new browsing session at that device. The performance analysis system can then provide the client device with background request instructions, in some cases tailored to the current computing resource availability, network characteristics, and other contextual details associated with the client device. In some embodiments, the client device can initiate a request for background request instructions (e.g., upon initialization of a browsing session or during an idle period). In some embodiments, the performance analysis system may proactively provide background request instructions to client devices (e.g., without receiving a request or a browsing session notification).

A user may interact with the browser application to request content items, such as web pages or other types of documents, hosted by content servers. During an idle period (e.g., after a predetermined or dynamically determined period of time has passed without any user-initiated requests), the browser may make one or more background requests according to the background request instructions received from the performance analysis system. In the example mentioned above, the browser can initiate multiple requests for the same content item, alternating the requests between a proxy and the origin server associated with the content. The browser or some other component of the client device can record metrics regarding performance of the retrieval process, rendering process, etc. In addition, the browser can record contextual information, such as information about current computing resource availability at the client device, currently executing processes, current network conditions, time of day, geographic location of the device, etc.

The browser can subsequently provide the request analysis information (e.g., performance metrics or information derived from the performance metrics), to the performance analysis system. In some embodiments, the request analysis information may also include contextual information. In some embodiments, the browser may provide the request analysis information to the performance analysis system immediately, or substantially immediately. In some embodiments, the browser may provide the data to the performance analysis system in a batch process at regular or irregular intervals. In some embodiments, the browser may provide the data to the performance analysis system at the conclusion of a browsing session, or upon receipt of a request for the data from the performance analysis system. Other transmission regimes may be used; the examples listed here are illustratively only, and are not intended to be limiting.

The performance analysis system may perform individual analysis of the received data and/or aggregated analysis of the data in conjunction with data received from the same client device or other client devices. In the present example, the performance analysis system may perform an aggregated analysis of data from multiple client devices (e.g., thousands or hundreds of thousands of client devices) in order to determine when, and under what conditions, retrieval of a particular content item is best performed using a proxy and when it is best for user devices to retrieve the content directly from the origin server. One result of such an analysis may be a rule set, promulgated to various client devices, indicating which devices should use a proxy when retrieving the content and under what conditions the device should do so. The example analyses described here and elsewhere in this disclosure are illustrative only, and are not intended to be limiting. Generally described, the performance analysis system may obtain request analysis information and perform any appropriate analysis, or no analysis at all, using the data.

Networked Content Consumption Environment

FIG. 1 illustrates an example content consumption environment in which features can be implemented for determining and executing background requests and obtaining request analysis information about the subsequent retrieval and/or rendering process. The content consumption environment can include a performance analysis system 100, multiple client devices 102a, 102b, and multiple content servers 104a, 104b. The various systems may communicate with each other via a communication network 150. The network 150 may be a publicly accessible network of linked networks, possibly operated by various distinct parties, such as the Internet. In other embodiments, the network 150 may include a private network, personal area network, local area network, wide area network, cable network, satellite network, cellular telephone network, etc. or combination thereof, each with access to and/or from the Internet.

The performance analysis system 100 can be a computing system configured to analyze request analysis information and generate background request instructions designed to get additional request analysis information and other data regarding content retrieval and rendering. For example, the performance analysis system 100 can be a server or group of servers that may be accessed via the network 150. In some embodiments, the performance analysis system 100 may be an intermediary system between the client devices 102 and content servers 104. For example, the performance analysis system 100 may be an intelligent proxy server, a system operated by an internet service provider (ISP), or some other device or group of devices that retrieve content on behalf of client devices 102. In additional embodiments, the performance analysis system 100 is not an intermediary between the client devices 102 and the content servers 104. Rather, the performance analysis system 100 can be a third-party system that exchanges data with the client devices 102 regarding which background content requests to execute and performance metrics associated with the execution of those background requests.

The performance analysis system 100 can include a number of components, such as an aggregated analysis module 110 to analyze request analysis information and other data regarding background requests, and a background request determination module 112 to identify which data is desired or required and which background requests can potentially lead to obtaining that data. The performance analysis system 100 may also include a number of data stores such as a devices data store 114 that stores data regarding the devices available to execute background requests, a requests data store 116 that stores information about the background requests that have been made or that can be made, a metrics data store 118 that stores performance metrics and other request analysis information recorded during background request execution, and a page profiles data store 120 that stores profile information about particular content pages based on the received performance metrics and/or aggregated analysis.

The performance analysis system 100 may include multiple computing devices, such as computer servers, logically or physically grouped together. The components of the performance analysis system 100 can each be implemented as hardware, such as a server computing device, or as a combination of hardware and software. In addition, the components of the performance analysis system 100 can be combined on one server computing device or separated individually or into groups on several server computing devices. In some embodiments, the performance analysis system 100 may include additional or fewer components than illustrated in FIG. 1. For example, a single component may perform the functions of both the aggregated analysis module 110 and the background request determination module 112. As another example, the performance analysis system 100 may include or otherwise be associated with various additional computing resources, such as content servers 104, content delivery network (CDN) systems, internet service providers (ISPs), and the like.

The client devices 102 can correspond to a wide variety of computing devices, including personal computing devices, laptop computing devices, hand held computing devices, terminal computing devices, mobile devices (e.g., mobile phones, tablet computing devices, etc.), wireless devices, electronic readers, media players, and various other electronic devices and appliances. A client device 102 may be configured with a browser application 122 to communicate via the network 150 with other computing systems, such the performance analysis system 100 or content servers 104, and to request, receive, process, and display content. Illustratively, the browser application 122 may provide functionality for executing background requests as instructed by the performance analysis system 100, and recording performance metrics and other request analysis information about the retrieval and/or rendering of content requested in a background request.

In operation, one or more client computing devices 102 may be associated with a performance analysis system 100. For example, a user may have an account with the performance analysis system 100, or the browser 122 or client device 102 may be configured to exchange information with the performance analysis system 100.

The content servers 104 can correspond to logical associations of one or more computing devices for hosting content and servicing requests for the hosted content over the network 150. For example, a content server 104a can include a web server component corresponding to one or more server computing devices for obtaining and processing requests for content (such as content pages) from client devices 102, the performance analysis system 100, or other devices or service providers. In some embodiments, one or more content servers 104 may be associated with a CDN service provider, an application service provider, etc.

Figure 2:
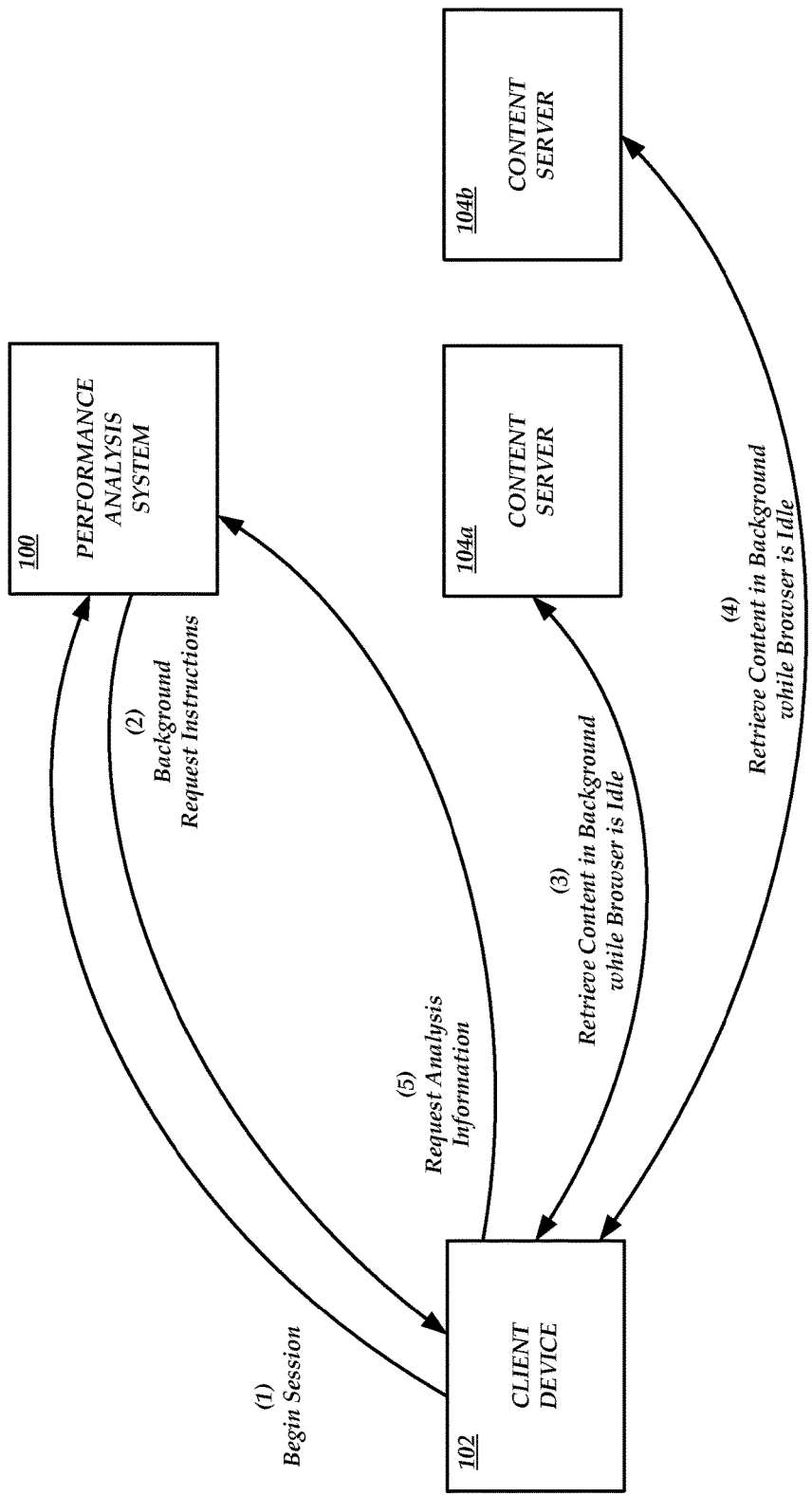
FIG. 2 is a block diagram of illustrative communications and data flows between a client device, a performance analysis system, and multiple content servers.

FIG. 2 illustrates example data flows and interactions between a client device 102, a performance analysis system 100 implemented as a third party service (e.g., not an intermediary system), and multiple content servers 104a, 104b. A user of the client device 102 may initiate a browsing session, and the client device 102 may transmit a notification of the new session or otherwise establish communications with the performance analysis system 100 at (1). The performance analysis system 100 may identify background requests that it would like the client device 102 to execute, and provide background request instructions based on that determination to the client device 102 at (2).

The user of the client device 102 may request content and perform various other computing tasks with the client device 102. When the browser or device is idle, the browser can initiate background requests to one or more content servers 104a, 104b at (3) and (4), respectively. The browser 122 or some other component of the client device 102 can record performance metrics and other request analysis information regarding the retrieval of the content requested in the background request(s), and provide the request analysis information to the performance analysis system 100 at (5).

Figure 3:
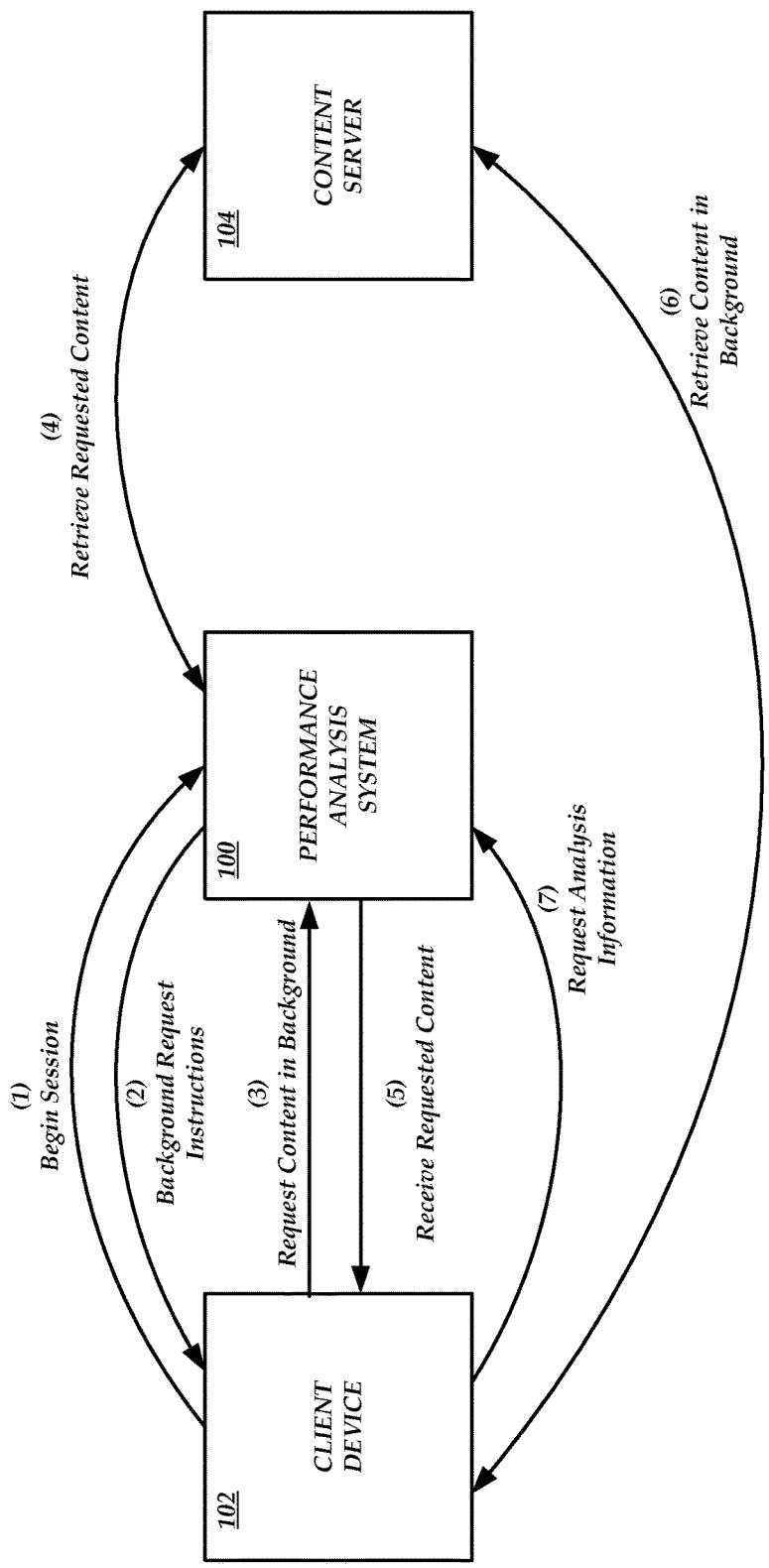
FIG. 3 is a block diagram of illustrative communications and data flows between a client device, a performance analysis system configured as an intermediary system, and multiple content servers.

FIG. 3 illustrates example data flows and interactions between a client device 102, an embodiment of a performance analysis system 100, and at least one content server 104. The performance analysis system 100 illustrated in FIG. 3 is implemented as an intermediary system between the client device 102 (and any number of other client devices) and a content server 104 (and any number of other content servers). As an intermediary system, content requests from client devices 102 can be transmitted to the performance analysis system 100 rather than directly to a content server.

In some embodiments, the intermediary system may act an intelligent proxy configured to pre-render or otherwise pre-process pages or selected portions of pages for delivery to the client devices 102. One example of such as system is described in U.S. patent application Ser. No. 13/174,589, filed on Jun. 30, 2011 and incorporated by reference herein for all that it discloses. In some embodiments, the intermediary system may include multiple systems, including systems to obtain content on behalf of users, and systems to provide the functionality of the performance analysis system. In some embodiments, the intermediary system may be a separate system that is associated with a performance analysis system.

Client devices 102 can also selectively retrieve content (or be instructed to retrieve content) directly from content servers 104, without use of the intermediary system. Performance data received by the performance analysis system 100 regarding the requests made via the intermediary and requests made directly to the content servers 104 can be used to determine which pages should be retrieved/pre-rendered via the proxy server and which should not, under what circumstances such pre-rendering should be employed, and other such optimizations.

A user of the client device 102 may initiate a browsing session, and the client device 102 may transmit a notification of the new session or otherwise establish communications with the performance analysis system 100 at (1). The performance analysis system 100 may identify background requests that it would like the client device 102 to execute, and provide background request instructions based on that determination to the client device 102 at (2).

The user of the client device 102 may request content and perform various other computing tasks with the client device 102. When the browser or device is idle, the browser can initiate background requests. In one example, the client device 102 may be instructed to request the same content page using at least two different requests. In one request, the client device 102 may execute a background request for the content by transmitting the request to a proxy, such as the performance analysis system 100 at (3). The performance analysis system 100 can retrieve the requested content from the content server 104 on behalf of the client device 102 at (4), and provide the requested content to the client device 102 at (5). For the second request, the client device 102 may execute the background request by transmitting the request directly to the content server 104 at (6), and receiving requested content in response to the background request. During these and any other background requests, the client device 102 can record performance metrics and other request analysis information regarding retrieval performance and rendering, and provide the metrics to the performance analysis system 10 at (7).

Process for Executing Background Requests

Figure 4:
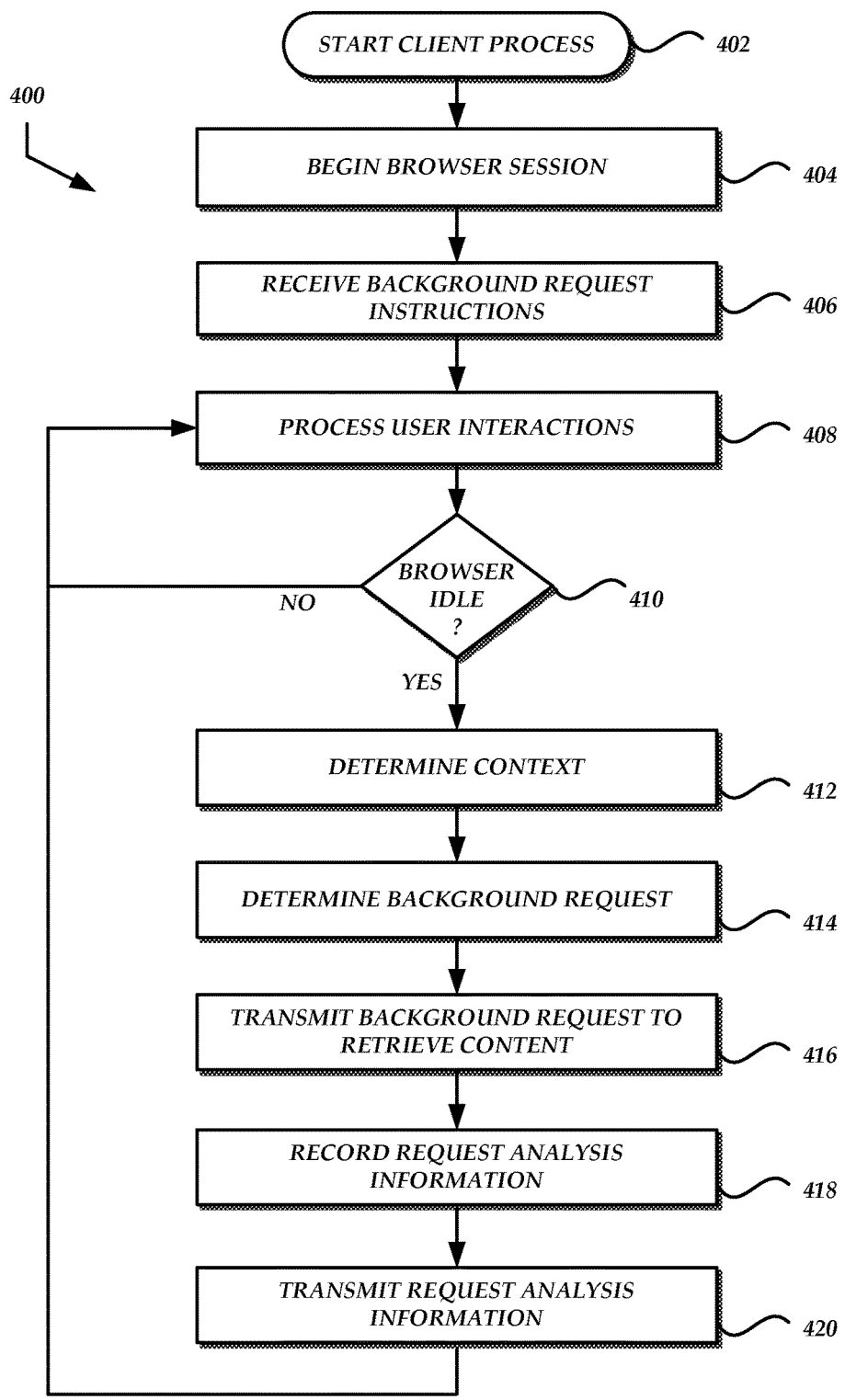
FIG. 4 is a flow diagram of an illustrative process for retrieving content in the background while a browser is idle and recording performance metrics regarding the retrieval.

FIG. 4 illustrates a sample process 400 for executing background requests to obtain performance metrics and other request analysis information. Advantageously, a browser 122 or some other component of a client device 102 (e.g., a browser toolbar or add-in, a separate application process, etc.) may perform the process 400 to execute background requests as instructed by a performance analysis system, and can provide request analysis information to the performance analysis system.

The process 400 begins at block 402. At block 404, a user of the client device 102 may begin a browser session. A browser session may be a period of substantially continuous browsing activity, such as content requests, network activity, scrolling and zooming on content pages, and other interactions with the browser application user interface ("UI") or content displayed therein. A browser session may begin when a client device 102 is powered on (or woken up from standby mode), when a browser application 122 is launched or accessed, when a content request is initiated, etc. In some embodiments, the client device 102 may notify the performance analysis system 100 of the initiation of a new browser session, either explicitly (e.g., by sending a notification) or implicitly (e.g., by sending a content request to a performance analysis system 100 that is configured to serve as a proxy or other intermediary).

At block 406, the browser 122 or some other component of the client device 102 can receive background request instructions from the performance analysis system 100. The client device 102 may receive background request instructions in response to notifying the performance analysis system 100 of the initiation of the browser session, in response to a request for background request instructions, etc. In some embodiments, the client device 102 may obtain background request instructions at other times. The background request instructions may include a decision tree or some other list of requests to make (e.g., URLs to access). The decision tree or list may include circumstances under which to make the requests (e.g., time of day, network conditions), whether to use a proxy or to access the corresponding content server directly, which metrics to record, some combination thereof, etc. In some embodiments, the background request instructions received by the client device 102 do not necessarily indicate that the requests are to be performed in the background as background requests. Rather, the browser 122 or client device 102 may automatically make such instructed requests as background requests. In some embodiments, the client devices may also be capable of autonomously determining what background requests to make.

At block 408, the browser 122 or some other component of the client device 102 can process user interactions, such as interactions with the browser UI, content, etc.

At decision block 410, the browser 122 or some other component of the client device 102 can determine whether the browser session is idle. The determination may be based partly or wholly on a measurement of elapsed time since the last user interaction. When the measurement exceeds a threshold, the browser session may be determined to be idle, and the process 400 can proceed to block 412. In some embodiments, other factors may be considered, or other techniques may be used, to determine when a browser session is idle. For example, network activity, time since the last user-initiated request (rather than any user interaction), whether the device's screen is currently on, whether the device is locked, whether the browser is in the foreground, whether CPU utilization exceeds a threshold, and the like may be considered.

At block 412, the browser 122 or some other component of the client device 102 can determine the current context in which the background request(s) will be executed. The context can be a factor in determining which background requests to make, and contextual data can be provided to the performance analysis system 100 with any metrics recorded for execution of the background request(s). Context can include computing resource availability and usage, network conditions, time of day, etc.

At block 414, the browser 122 or some other component of the client device 102 can determine which background request or requests to execute. The determination can be based on the current context of the browsing session or other environmental factors. For example, the background request instructions may indicate which requests to make in various contexts. Using the context determined above, the client device 120 can determine the appropriate background request to execute. In some embodiments, the background request instructions may be a list of one or more requests to make, without any decision or determination regarding the context in which the requests should be executed.

At block 416, the browser 122 can transmit a background request to retrieve content. As described above, the background request can be a request that is automatically transmitted, and retrieved content is not necessarily displayed to the user (although it may be cached for future use). The content may nevertheless be rendered, such as in a hidden browser tab or frame buffer. In some embodiments, the browser 122 may execute the background request in a separate browser process, such as a sandboxed browser process.

At block 418, the browser 122 or some other component of the client device 102 can record performance metrics or other request analysis information regarding execution of the request. The request analysis information may include metrics related to the number of network connections opened, number of network resources obtained, Domain Name System ("DNS") resolution latency and performance, total time to load the content page and individual network resources, number of times the content page or individual network resources was retrieved, average time to load the content page and individual network resource (e.g., if multiple background requests for a single content page are executed), bandwidth utilization, network latency, processor utilization, memory utilization, cache hit/miss ratio, load time per cache miss, and other information associated with execution of content requests and rendering.

At block 420, the browser 122 or some other component of the client device 102 can transmit the request analysis information to the performance analysis system 100. The transmission may occur substantially immediately after execution of the background request is complete (or shortly thereafter), in some subsequent batch transmission process, during a subsequent idle period, upon termination of the browsing session, upon request by the performance analysis system 100, etc.

In some embodiments, execution of background requests can be interrupted or terminated when user-interactions or other comparatively important actions are initiated. For example, during execution of a background request, a user may initiate a request for content. The user's request for content may be given priority over the background request such that the user experience is not degraded as a result of the background request or otherwise during development of request analysis information. In some embodiments, request analysis information regarding the user-initiated request may be provided to the performance analysis system 100. In some embodiments, partial request analysis information regarding the terminated/halted background request may be provided.

In some embodiments, a user may use the browser 122 or some other module or component to maintain configuration settings regarding use of the browser 122 or user computing device in conjunction with the performance analysis system 100. For example, a user may be able to "opt in" or "opt out" of executing background requests on the user computing device. As another example, a user may configure which network connections may be used to execute background requests (e.g., WiFi, cellular networks), how long metrics and other data associated with the user computing device may be stored at the performance analysis system 100, etc.

In some embodiments, a performance analysis system may provide the browser 122 or some other module or component with a request for information or a list of desired information, rather than background request instructions. The request may indicate a particular data deficiency for which the performance analysis system 100 would like to receive data. For example, the request may indicate that data regarding requests made via a particular internet service provider ("ISP") may be desired. In response, the browser 122 may execute background requests when it determines that it is connected to the ISP, and provide metrics to the performance analysis system 100. The particular background requests that are made may be determined by the browser 122, or may be based on data received from some other source, such as the performance analysis system 100.

Process for Generating Background Request Instructions

Figure 5:
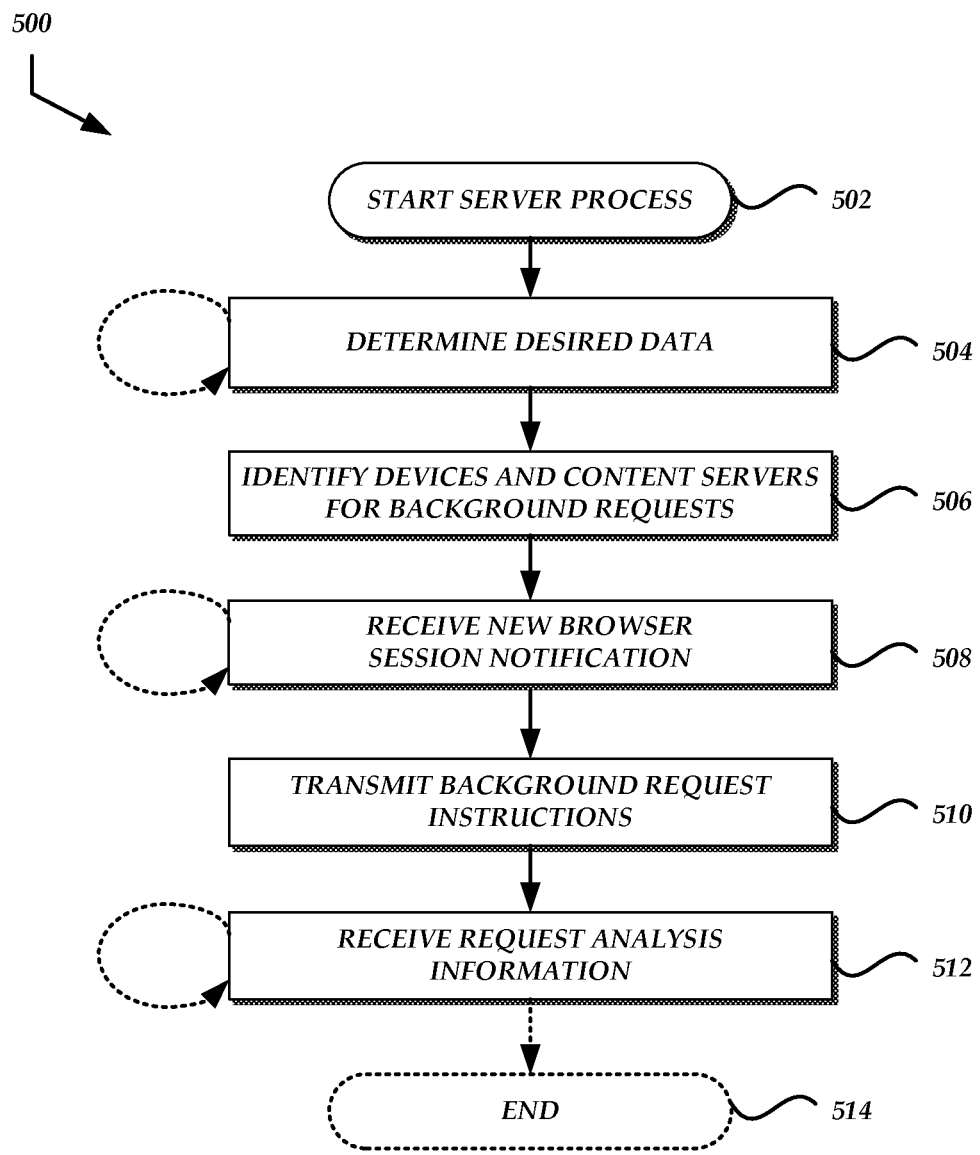
FIG. 5 is a flow diagram of an illustrative process for identifying desired performance data and generating background request instructions to obtain the desired performance data.

FIG. 5 illustrates a sample process 500 for generating background request instructions to be provided to client devices 102. Advantageously, a performance analysis system 100 may perform the process 500 in order to obtain an adequate data set for performing various performance analyses, to determine various improvements or optimizations, etc.

The process 500 begins at block 502. At block 504, the aggregated analysis module 110 or some other component of the performance optimization system 100 can determine the data that is required or desired in order to perform a meaningful analysis. One such scenario may be when a particular client device characteristic is an important predictor of unsatisfactory performance. Obtaining a critical mass of data regarding requests from devices associated with that characteristic can aid in determining which improvements or optimizations may be implemented.

The desired request analysis information may include any data that is difficult or impossible to obtain from test fleets under the direct or exclusive control of the performance analysis system 100 (or an entity associated therewith), or reported from client devices based on actual user-initiated requests. For example, the amount of data associated with requests in particular real-world contexts and environmental characteristics may not be statistically significant or otherwise adequate. In such cases, the performance optimization system 100 may determine that automatically generated background requests, executed at client devices during idle periods, can provide such data. In some embodiments, as shown, the performance analysis system 100 may execute block 504 continuously or for lengthy periods of time, such as during a particular analysis process. The performance analysis system 100 may continue to determine desired data even after the process 500 has proceeded to block 506 (e.g., one or more parallel processes may be spawned to continue execution at block 506 in order to obtain a particular piece or set of desired data).

At block 506, the background request determination module 112 or some other component of the performance analysis system 100 may identify which specific client device or devices, or general class of client devices (e.g., those associated with particular characteristics) are to execute particular background requests. In some embodiments, the background request determination module 112 may determine which background requests are to be made by any particular client device 102 based on, e.g., the most visited pages by the device, the most visited pages across a group of client devices, a prediction regarding which pages the client device is likely to request next, etc. The background request determination module 112 can also determine the specifics of the background requests, such as the content servers from which to request content, whether to request content directly or via a proxy, and other details for executing the request in order to provide the desired data. In some embodiments, background request instructions generated for a particular client device 102 may be calibrated such that execution of the requests does not harm current or future device performance (e.g., battery life, processor utilization, etc.).

At block 508, the performance analysis system 100 may receive, from a client computing device 102, a notification that a new browser session has begun. In some embodiments, as shown, the performance analysis system 100 may obtain multiple such notifications from multiple different client computing devices 102, and each time the process 500 may proceed to block 510 (e.g., one or more parallel processes may be spawned to continue execution at block 510).

At block 510, the performance analysis system 100 can transmit background request instructions to the client device 102. As described above, the transmission may be in response to a request or notification from the client device 102. In some embodiments, the performance analysis system 100 can transmit background request instructions without first receiving a request. For example, by utilizing a connection established according to a bi-directional communication protocol (e.g., SPDY), the performance analysis system 100 may transmit background request instructions to the client device 102 without first receiving a request from the client device 102, as would typically be required in a Hypertext Transmission Protocol ("HTTP") connection. In some embodiments, the background request instructions transmitted to the client device 102 do not necessarily indicate that the requests are to be performed in the background as background requests. Rather, the browser 122 or client device 102 may automatically make such instructed requests as background requests.

At block 512, the performance analysis system 100 can receive request analysis information from the client device 102 regarding execution of background requests (e.g., performance metrics and contextual information). The performance analysis system 100 can store the data in a data store (e.g., a metrics data store 118 or a requests data store 116). In some embodiments, the performance analysis system 100 adds the data to a current analysis process, e.g., using the aggregated analysis module 110. Illustratively, the analysis may aim to develop page profiles regarding request, retrieval, and rendering performance for particular pages, information about how future requests for the page can be optimized, etc. The process 500, or a single parallel thread of the process 500, may terminate at block 514 once all data has been received from the client device 102.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by one or more processors (each including digital logic circuitry for executing program instructions) or computing devices, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

For example, the processes described with respect to FIGS. 4 and 5 may be embodied in a set of executable program instructions stored on a computer-readable medium, such as one or more disk drives, of the client device or a computing system with which the performance analysis system is associated. When a process is initiated, the executable program instructions can be loaded into memory, such as RAM, and executed by one or more processors of the client device or computing system. In some embodiments, the computing system may include multiple computing devices, such as servers, and the processes may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:

one or more server computing devices comprising one or more processors and one or more computer storage media, the one or more server computing devices programmed to at least:

identify, based at least on first request analysis information, one or more metrics regarding execution of a request for a content page hosted by a content server, wherein the one or more metrics indicate information associated with network or user computing device performance;

generate a plurality of background request instructions based on the identified one or more metrics, wherein each of the background request instructions comprise one or more instructions to provide requests for the content page associated with a network address to one or more content servers of a plurality of content servers storing the content page;

transmit at least one of the plurality of the background request instructions to each of a plurality of user computing devices;

receive, from one or more of the plurality of user computing devices, second request analysis information, the second request analysis information reflecting the one or more metrics associated with execution of the generated background requests;

determine, using the received second request analysis information, characteristics associated with user computing devices indicating that, in response to user requests, user computing devices associated with the determined characteristics are to provide future requests for the content page to a particular content server of the plurality of content servers storing the content page; and provide, to the plurality of user computing devices, information indicating the determined characteristics.

2. The system of claim 1, wherein the at least one background request instructions are transmitted to a particular user computing device of the plurality of user computing devices in response to one of: a request from the particular user computing device; or a notification received from the particular user computing device regarding initiation of a new browser session.

3. The system of claim 1, wherein the at least one background request instructions transmitted to a particular user computing device are initiated during an idle period that begins a threshold period of time after a most recent user interaction with one of: the particular user computing device; or a browser application executing on the particular user computing device.

4. The system of claim 1, wherein the at least one background request instructions transmitted to a particular user computing device are initiated during an idle period, and wherein the idle period comprises a period of time during which execution of the background request instruction is not expected to substantially interfere with use of the particular user computing device or a browser executing on the particular user computing device.

5. The system of claim 1, wherein the one or more server computing devices are further programmed to identify the one or more metrics based at least on an absence of a statistically significant amount of data associated one of: the content page; or one or more of the content servers.

6. The system of claim 1, wherein the plurality of content servers comprise proxy servers storing pre-rendered versions of the content page.

7. The system of claim 1, wherein a metric indicates information associated with network or user computing device performance during content retrieval and rendering.

8. A computer-implemented method for obtaining request analysis information, the method comprising:
   identifying, based at least on first request analysis information, one or more metrics regarding execution of a request for network content, wherein the one or more metrics indicate information associated with network or user computing device performance;
   generating, by a server comprising hardware that executes specific instructions, a plurality of background request instructions based on the identified one or more metrics, wherein each of the background request instructions comprise one or more instructions to provide requests for network content to one or more content servers of a plurality of content servers storing the network content;
   transmitting, by the server, at least one of the plurality of the background request instructions to each of a plurality of user computing devices;
   receiving, from one or more of the user computing devices, second request analysis information reflecting the one or more metrics associated with execution of the generated background requests;
   determining, using the received second request analysis information, characteristics associated with user computing devices indicating that, in response to user requests, user computing devices associated with the determined characteristics are to provide future requests for the network content to a particular content server of the plurality of content servers storing the network content; and
   providing, to the plurality of user computing devices, information indicating the characteristics.

9. The computer-implemented method of claim 8, further comprising:
   detecting, by a client component executing on a particular user computing device that received at least one background request instructions, that the particular user computing device is idle; and
   in response, executing, by the particular client component, the at least one background request instructions.

10. The computer-implemented method of claim 8, wherein the at least one background request instructions are transmitted to a particular user computing device in response to one of: a request from the particular user computing device; or a notification received from the particular user computing device regarding initiation of a new browser session.

11. The computer-implemented method of claim 8, wherein the at least one background request instructions transmitted to a particular user computing device are initiated during an idle period that begins a threshold period of time after a most recent user interaction with one of: the particular user computing device; or a browser application executing on the particular user computing device.

12. The computer-implemented method of claim 8, wherein the at least one background request instructions transmitted to a particular user computing device are initiated during an idle period, wherein the idle period comprises a period of time during which execution of the at least one background request instructions are not expected to substantially interfere with use of the particular user computing device or a browser executing on the particular user computing device.

13. The computer-implemented method of claim 8, wherein the received second request analysis information further comprises contextual information regarding the context in which the background requests were executed.

14. The computer-implemented method of claim 8, wherein the one or more metrics comprise data related to one of: a number of network connections opened; a number of network resources obtained; Domain Name System ("DNS") resolution; a total time to load the network content; a time to load a network resource associated with the network content; a number of times the network content has been retrieved; a number of times an individual network resource associated with the network content has been retrieved; an average time to load the network content; an average time to load one or more network resources associated with the network content; bandwidth utilization; network latency; processor utilization; memory utilization; a cache hit rate; a load time per cache miss.

15. The computer-implemented method of claim 8, further comprising:
   identifying the one or more metrics based at least on an absence of a statistically significant amount of data associated one of: the network content; or one or more of the content servers.

16. The computer-implemented method of claim 8, further comprising:
   detecting a data deficiency in the first request analysis information, the data deficiency associated with a characteristic of a particular user computing device; and
   selecting the plurality of user computing devices based at least on the characteristic of the particular user computing device.

17. The computer-implemented method of claim 8, further comprising:
   detecting a data deficiency in the first request analysis information, the data deficiency associated with a characteristic of the network; and
   selecting the plurality of user computing devices based at least on the characteristic of the network.

18. The method of claim 8, wherein the plurality of content servers comprise proxy servers storing pre-rendered versions of the network content.

19. A non-transitory computer storage medium comprising a browser module configured to execute a process on a user computing device, the process comprising:
   receiving, from a server separate from the user computing device, a plurality of background request instructions to be initiated during an idle period;
   determining to execute the plurality of background request instructions during idle periods of the user computing device;
   detecting that the user computing device is idle; and
   in response to detecting that the user device is idle:
      initiating, during an idle period, one or more background request instructions of the plurality of background request instructions each comprising instructions to provide requests for network content to one or more content servers of a plurality of content servers storing the content page; and transmitting, to the server, request analysis information reflecting one or more metrics associated with execution of the one or more background request instructions of the plurality of background request instructions, wherein the one or more metrics indicate information associated with network or the user computing device performance.

20. The non-transitory computer storage medium of claim 19, wherein initiating the one or more background request instructions comprise initiating the one or more background request instructions without user initiation.

21. The non-transitory computer storage medium of claim 19, wherein the requested network content is rendered into one of a hidden browser tab or a hidden frame buffer.

22. The non-transitory computer storage medium of claim 19, the process further comprising:

determining that a user-initiated action has occurred during execution of the one or more background request instructions; and in response, terminating the one or more background request instructions.

23. The non-transitory computer storage medium of claim 19, wherein the plurality of content servers comprise proxy servers storing pre-rendered versions of the network content.

* * * * *